United States Patent [19]
Peterson et al.

[11] Patent Number: 6,083,310
[45] Date of Patent: Jul. 4, 2000

[54] COLORED INKS COMPRISING POLYMERIC COLORANTS FOR BINARY ARRAY PRINTING AND METHOD OF USING

[75] Inventors: Christopher D. Peterson, Evanston; Russell R. Peters, Streamwood; John R. Craven, Schaumburg, all of Ill.

[73] Assignee: Marconi Data Systems, Inc., Wood Dale, Ill.

[21] Appl. No.: 09/086,125

[22] Filed: May 28, 1998

[51] Int. Cl.⁷ ............................. C09D 11/02; C09D 11/14
[52] U.S. Cl. ..................... 106/31.27; 106/31.37; 106/31.43; 106/31.52; 106/31.57
[58] Field of Search ............ 106/31.27, 31.37, 106/31.43, 31.52, 31.57

[56] References Cited

U.S. PATENT DOCUMENTS

| | | | |
|---|---|---|---|
| Re. 34,932 | 5/1995 | Gray | 347/74 |
| 3,157,663 | 11/1964 | Bencze | 546/330 |
| 3,787,173 | 1/1974 | Greenshields et al. | 8/501 |
| 3,937,851 | 2/1976 | Bellanca et al. | 426/548 |
| 4,167,510 | 9/1979 | Brendle | 534/729 |
| 4,260,531 | 4/1981 | Wachtel | 524/389 |
| 4,284,729 | 8/1981 | Cross et al. | 521/158 |
| 4,375,357 | 3/1983 | Wingard, Jr. et al. | 8/647 |
| 4,623,689 | 11/1986 | Shintani | 106/31.43 |
| 4,664,708 | 5/1987 | Allen | 106/31.46 |
| 4,732,570 | 3/1988 | Baumgartner et al. | 8/506 |
| 5,030,697 | 7/1991 | Hugl et al. | 525/326.9 |
| 5,037,697 | 8/1991 | Fujisawa et al. | 428/373 |
| 5,043,013 | 8/1991 | Kluger et al. | 106/31.32 |
| 5,098,475 | 3/1992 | Winnik et al. | 106/31.43 |
| 5,176,745 | 1/1993 | Moore et al. | 106/31.27 |
| 5,231,135 | 7/1993 | Machell et al. | 525/123 |
| 5,310,887 | 5/1994 | Moore et al. | 534/729 |
| 5,534,052 | 7/1996 | Mennicke | 106/31.43 |
| 5,594,044 | 1/1997 | Yang | 106/31.05 |
| 5,601,639 | 2/1997 | Myers et al. | 106/31.58 |

FOREIGN PATENT DOCUMENTS

| | | |
|---|---|---|
| 0723999 | 7/1996 | European Pat. Off. |
| 0730014 | 9/1996 | European Pat. Off. |
| 59-027973 | 2/1984 | Japan . |
| 1325615 | 8/1973 | United Kingdom . |
| WO 98/13430 | 4/1998 | WIPO . |

OTHER PUBLICATIONS

Milliken Chemical, *Quality Leadership Through Research*, brochure dated Oct. 1992.

*Primary Examiner*—Helene Klemanski
*Attorney, Agent, or Firm*—Leydig, Voit & Mayer, Ltd.

[57] ABSTRACT

An ink jet printing ink containing a polymeric colorant and a substantially non-aqueous vehicle and a method for binary array continuous ink jet printing using the ink.

15 Claims, No Drawings

COLORED INKS COMPRISING POLYMERIC COLORANTS FOR BINARY ARRAY PRINTING AND METHOD OF USING

FIELD OF THE INVENTION

The present invention relates to colored inks for binary array continuous ink jet printers.

BACKGROUND OF THE INVENTION

In continuous binary array (or digital) ink jet printing, ink is supplied under pressure to a manifold region that distributes the ink to a plurality of orifices, typically arranged in a linear array. The ink discharges from the orifices in filaments, which break into droplet streams. Printing is accomplished by selectively charging and deflecting drops from the drop streams and depositing at least some of the drops on a print receiving medium while other drops strike a drop catcher device. As one example of a continuous binary array printer, reference is made to U.S. Reissue Pat. No. 34,932.

In binary array printing, jet straightness and wetting of the nozzle plate in the area of the orifices is vitally important. The slightest deposit, or a non-uniform wetting on the orifice plate may cause excessive raggedness of the jets and results in poor print quality. Inks for use specifically in binary array printers have been described, for example, in U.S. Pat. No. 5,601,639.

Printer runability is a primary concern during the formulation of binary array inks and severely limits which raw materials can be used in the inks. Issues influencing runability of an ink in a binary array printer include, but are not limited to: stable jet formation, print degradation, jet straightness, shear stress stability, corrosivity, and sensitivity to environmental conditions.

The formation of stable jet break off is critical to the operation of a continuous ink jet printer, especially binary array printers. Variations of jet formation will lead to uncontrolled jets. In addition to designs of the printer, the viscosity of the ink at the time of printing controls this issue. Print degradation is a loss of print quality, often due to ink build up on the orifice face. The presence of some salts and other soluble contaminants influence this issue.

Jet straightness is critical to operation of a binary array printer. Deviation of one jet from its expected path can cause that jet to not be controlled and cause a print failure. This control issue is more significant in the operation of binary array continuous ink jet printheads than in corresponding non-array continuous ink jet printheads. Particulate and insoluble contaminants in or around the nozzle orifice are factors in influencing this issue. High purity and solubility are required for all components of the ink.

The stability of the ink to shear forces is required because the ink is re-circulated through the printer by a gear pump. If the ink is unstable to shear forces, extended use in the printer will be curtailed. Instability to shear forces may cause the formation of insoluble material and lead to printer failure.

Similarly, if the ink is corrosive to the printer components, extended printer usability will be reduced. Selection of conductivity agents and dyes is strongly influenced by this issue.

If the ink is extremely sensitive to the ambient conditions, such as relative humidity, the properties of the ink will change and limit the use in the printer. Insoluble material may also be formed if the ink is too sensitive to the operating conditions of the printer.

Further, it is well-recognized that solvent evaporation occurs during continuous ink jet printing, requiring the use of make-up fluid to maintain a desired ink composition.

Because of all of the foregoing considerations, it is difficult to provide a suitable ink that functions satisfactorily in a binary array ink jet printing system.

SUMMARY OF THE INVENTION

The present invention provides an ink that is suitable for binary array ink jet printing. Further, such an ink when formulated with different colorants are fully compatible with each other. Such inks also show excellent long term stability, have excellent solvent release and run extremely well in a binary array ink jet printer.

The composition of the inks comprises one or more organic solvents and a polymeric colorant. Usually the ink contains a modified cellulose resin, and optionally other additives.

To the extent that any polymeric colorant has been used in the field of ink jet printing, the colorant has been used in aqueous ink formulations and such formulations have been used only for non-binary or non-array printing.

The present invention also provides a method of forming printed images on a variety of substrates using an ink composition of the present invention. In accordance with the present invention, the method comprises projecting a plurality of droplets of the ink onto the surface of a substrate, such as paper, plastics or metals and controlling the direction of the drops electronically so that the droplets form the desired image on the surface. As indicated, such inks perform especially well in binary array printing.

DETAILED DESCRIPTION OF THE PREFERRED EMBODIMENT

As stated, the ink composition of the present invention comprises an organic solvent, a polymeric colorant, usually a modified cellulose resin, and, optionally, other additives such as a modifying resin and a conductivity agent.

General Properties

In general, the ink compositions of the present invention exhibit the following characteristics: (1) a shear viscosity, from 1.5 to 8.0 cP at 25° C.; (2) an electrical resistivity from 50 to 2000 ohm-cm; and (3) a sonic velocity from 1100 to 1600 meters per second.

Solvents

Organic solvents suitable for use as the vehicle in the present invention include ketones such as acetone, methyl ethyl ketone, methyl isobutyl ketone, diethyl ketone and cyclohexanone and the like, esters such as ethyl acetate, n-propyl acetate, butyl acetate, and the like, alcohols such as methanol, ethanol, n-propanol, i-propanol, n-butanol, cyclohexanol and the like, hydrocarbon solvents such as hexane, heptane, toluene, benzene, cyclohexane and the like, glycols such as ethylene glycol, propylene glycol, glycerin and the like, glycol ethers such as ethylene glycol dimethyl ether, cellosolve, diethylene glycol diethylether, and the like, and other solvents commonly known to one skilled in the art. Acetone is a preferred solvent. A mixture of solvents can be used, if so desired. For example, denatured ethanol may be used to replace up to half of the acetone by weight.

Duplicating Fluid #5 from Eastman Chemical which is a specially denatured ethanol, by addition of 5% n-propyl acetate and 4.5% isopropanol, is a preferred solvent.

The vehicle used in accordance with the present invention preferably is substantially non-aqueous. The vehicle should contain less than about 10 percent water, preferably less than about 5 percent water and most preferably less than about 2 percent water.

Polymeric Colorant

The ink compositions contain a colorant which imparts the desired color to the printed message. Any dye from the family of polymeric colorants may be used in this invention. Polymeric colorants are well known in the art and are derived from various polymeric materials. To be useful in the present invention, the polymeric colorant must be soluble in an organic solvent. Preferably, the colorant is soluble in an amount of at least about 3 percent by weight, more preferably in an amount of at least about 5 percent, and most preferably in an amount of at least about 10 percent, all based on the total weight of solvent and colorant.

Useful polymeric colorants include those described in U.S. Pat. No. 5,043,013, wherein the polymeric colorants are of the formula:

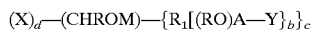

wherein:

X is a polar group selected from sulfonic acids, sulfonic acid salts, sulfonamides, sulfonates, carboxylic acids, carboxylic acid salts, carboxylic acid amides, carboxylic aldehydes, ureas, thioureas, nitro groups, hydroxy groups, polyethers, and hydroxyalkylethers;

R is unsubstituted or substituted straight or branched alkylene of 2–4 carbons, or mixtures thereof;

Y is selected from H, alkanoyl, aroyl, alkoxycarbonyl, unsubstituted or substituted carbamoyl, or —CH$_2$CH(R$_2$)—X;

R$_1$ is selected from nitrogen, oxygen, sulfur, or a sulfur-containing divalent linking group;

R$_2$ is hydrogen or a lower alkyl group containing one to about five carbon atoms;

a is an integer of from 6 to about 40;

b and c are each independently selected from one or two;

d is an integer of from one to four; the product of (a) (b) (c) is an integer of from 6 to about 40;

and CHROM is a chromophore selected from nitro, nitroso, monoazo, disazo and trisazo, diarylmethane, triarylmethane, xanthane, acridine, methine, thiazole, indamine, azine, oxazine, or anthraquinone, where the {RO}$_a$ moiety is bonded to a carbocyclic aromatic ring of the (CHROM) through R$_1$.

Another class of useful polymeric colorants is that described in U.S. Pat. No. 5,534,052, wherein the colorants are the reaction product of:

A) Polyamidoamines having an average molecular weight, determined as the weight-average, of 260 to 10,000, which in turn are obtainable by reaction of aliphatic polyamines (I) which contain at least two primary amino groups and at least one secondary amino group, if appropriate as a mixture with diamines (II), with dicarboxylic acids (alpha), with the proviso that the molar ratio of the sum of primary and secondary amino groups contained in (I) and if appropriate (II) to the carboxyl groups in (alpha)>1, and is preferably 1.05 to 3, with B) a dyestuff which contains, per molecule, at least one group which is reactive towards primary and secondary amino groups, the molar ratio of the sum of primary and secondary amino groups contained in A) to B) being 1 to 15, preferably 1 to 10.

Additionally, other useful polymeric colorants are polyoxyalkylene-substituted organic chromophores, wherein the polyoxyalkylene substituent is covalently bonded to a carboxylic acid, such as those described in U.S. Pat. No. 5,310,887, which include compounds of the formula: A—{Y—X—C(O)—R$_1$—C(O)OH}$_p$ where A is an organic chromophore; Y is a polyoxyalkylene substituent having from 1 to 200 alkylene oxide radicals of C$_{2-18}$ alkylene oxides; X is a nucleophile selected from O, NR$_2$ and S, where R$_2$ is H or C$_{1-18}$ alkyl; R$_1$ is selected from alkylene, alkenylene, phenylene and phenylenealkylene, which may optionally be substituted with alkyl or alkenyl, provided that the total number of carbon atoms is between 2 and 30; and p is an integer from 1 to 6.

Further useful polymeric colorants include polyalkylene oxy-substituted chromophores described in U.S. Pat. No. 3,157,663; chromophores grafted to copolymers of acrylamide and unsaturated dicarboxylic acid anhydride, as shown in U.S. Pat. No. 5,037,697; and homo- or copolymers of ethylenically unsaturated sulfonic acids dyes with a basic dye, as shown in U.S. Pat. No. 4,623,689. Other polymeric dyes are described in U.S. Pat. Nos. 3,937,851; 4,167,510; 4,284,729; 4,375,357; 4,664,708; 4,732,570; and 5,098,475; German Patent Nos. 2,018,855 and 2,214,966; and Japanese Patent No. A5 927, 973.

One example of useful colorants is the "Reactint" line of dyes from Millikin Chemical. Examples of these dyes include but are not limited to Millijet Blue 28, Millijet Red 17, Millijet Yellow 26, Millijet Yellow 11, Millijet Black 65, Millijet Violet 28, and Millijet Orange 31 and the like.

The colorant is present in the ink composition in an amount required to produce the desired contrast and readability or produce a change in hue when mixed with other inks of the present invention. The colorant is preferably in the range of about 2 and about 15 percent, more preferably in the range of about 3 percent and about 8 percent, by weight, based on the total weight of the composition. The preferred colorant content may vary by the specific colorant.

Modified Cellulose Resins

The ink formulations may contain a modified cellulose resin to improve printer runability, adhesion, and solvent release. These modified cellulose resins may be cellulose esters, and include but are not limited to cellulose nitrate, ethyl cellulose, cellulose acetate, cellulose acetate butyrate, cellulose acetate propionate, and hydroxypropyl cellulose. A preferred modified cellulose resin is cellulose nitrate.

It is known to those skilled in the art that modified cellulose resins are graded by solution viscosity. The lower viscosity grades of modified cellulose resins are a preferred component in the present invention.

The jet ink composition may contain the modified cellulose resin up to about 15 percent by weight, preferably in the range of about 3 to about 10 percent by weight, and more preferably in the range of about 5 to about 8 percent by weight.

Other Additives.

The present invention may also contain additives for adjusting electrical conductivity, surface tension, foam forming, speed of evaporation and adhesion to the substrate. The preferred electrical resistivity is between 900 Ω•cm and 1500 Ω•cm.

The compositions of the present inventions may contain conductivity agents. If present, they are usually present in amounts of from about 0.0 percent to about 2.0 percent. Examples of suitable conductivity agents for the present invention include ammonium hexafluorophosphate and tetraethylammonium bromide, and the like.

The ink composition may contain an additional modifying resin to improve the adhesion, scratch resistance, film flexibility, film hardness and film tack. These resins include but are not limited to acrylic copolymers, polyesters and polyurethanes. A preferred resin is styrene-acrylic copolymer, more preferred are resins with a molecular weight less than 10,000. Such a resin may be present in the present invention up to about 10 percent, preferably in the range of about 3 percent to about 5 percent, more preferably in the range of about 3 percent to about 4 percent, by weight.

A preferred use of the present invention is to produce the three primary colors for subtractive color mixtures: red, yellow and blue. A full spectrum of colors may be made by combining two of the primary colors in differing proportions.

The present invention is further illustrated by the following, non-limiting example.

EXAMPLE I

A jet ink vehicle was prepared by employing the following formulation

| Component | Percent by weight |
|---|---|
| Nitrocellulose wet with IPA | 13% |
| Acetone | 44% |
| Duplicating fluid #5 | 38.3% |
| Styrene acrylic resin | 4% |
| Tetraethylammonium bromide | 0.7% |

Into this vehicle, the preferred formulations are as follows:

| | Red | Blue | Yellow |
|---|---|---|---|
| Vehicle | 95% by weight | 93% | 97% |
| Millijet Red 17 | 5% | | |
| Millijet Blue 28 | | 7% | |
| Millijet Yellow 26 | | | 3% |

The above formulations were prepared and tested for stability, compatibility and runability in a Videojet SR or PrintPro ES printer. The individual formulations showed an excellent shelf life. An ink formed by mixing the above inks showed the same behavior as the individual formulations. The combined and individual inks also showed excellent runability in a binary array continuous ink jet printer, such as the Videojet SR and PrintPro ES printers.

All patents and other literature references mentioned above are hereby incorporated into this specification, in their entirety.

What is claimed is:

1. An ink suitable for ink jet printing comprising a polymeric colorant and a solvent-based vehicle with a water content of less than about 10 percent by weight, said ink having the following characteristics: (1) a shear viscosity, from about 1.5 to about 8.0 cP at 25° C.; (2) an electrical resistivity from about 50 to about 2000 ohm-cm; and (3) a sonic velocity from about 1100 to about 1600 meters per second.

2. The ink of claim 1 further comprising a modified cellulose resin.

3. The ink of claim 2 wherein the modified cellulose resin is selected from the group consisting of cellulose nitrate, ethyl cellulose, cellulose acetate, cellulose acetate butyrate, cellulose acetate propionate, and hydroxypropyl cellulose.

4. The ink of claim 1 further comprising a modifying resin.

5. The ink of claim 4 wherein the modifying resin is selected from the group consisting of acrylic copolymers, polyesters and polyurethanes.

6. The ink of claim 1 wherein the ink contains less than about two percent by weight water.

7. The ink of claim 1 wherein the polymeric colorant has the formula:

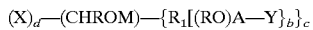

wherein:

X is a polar group selected from sulfonic acids, sulfonic acid salts, sulfonamides, sulfonates, carboxylic acids, carboxylic acid salts, carboxylic acid amides, carboxylic aldehydes, ureas, thioureas, nitro groups, hydroxy groups, polyethers, and hydroxyalkylethers;

R is unsubstituted or substituted straight or branched alkylene of 2–4 carbons, or mixtures thereof;

Y is selected from H, alkanoyl, aroyl, alkoxycarbonyl, unsubstituted or substituted carbamoyl, or —CH$_2$CH(R$_2$)—X;

R$_1$ is selected from nitrogen, oxygen, sulfur, or a sulfur-containing divalent linking group;

R$_2$ is hydrogen or a lower alkyl group containing one to about five carbon atoms;

a is an integer of from 6 to about 40;

b and c are each independently selected from one or two;

d is an integer of from one to four; the product of (a) (b) (c) is an integer of from 6 to about 40;

and CHROM is a chromophore selected from nitro, nitroso, monoazo, disazo and trisazo, diarylmethane, triarylmethane, xanthane, acridine, methine, thiazole, indamine, azine, oxazine, or anthraquinone, where the {RO}$_a$ moiety is bonded to a carbocyclic aromatic ring of the (CHROM) through R$_1$.

8. The ink of claim 1 wherein the polymeric colorant comprises a compound of the formula A—{Y—X—C(O)—R$_1$—C(O)OH}$_p$ where A is an organic chromophore; Y is a polyoxyalkylene substituent having from 1 to 200 alkylene oxide radicals of C$_{2-18}$ alkylene oxides; X is a nucleophile selected from O, NR$_2$ and S, where R$_2$ is H or C$_{1-18}$ alkyl; R$_1$ is selected from alkylene, alkenylene, phenylene and phenylenealkylene, which may optionally be substituted with alkyl or alkenyl, provided that the total number of carbon atoms is between 2 and 30; and p is an integer from 1 to 6.

9. In a method for forming printed images on a substrate by binary array continuous ink jet printing of an ink, the improvement comprising using as the ink an ink comprising a polymeric colorant and a solvent-based vehicle with a water content of less than about 10 percent by weight, said ink having the following characteristics: (1) a shear viscosity, from about 1.5 to about 8.0 cP at 25° C.; (2) an electrical resistivity from about 50 to about 2000 ohm-cm; and (3) a sonic velocity from about 1100 to about 1600 meters per second.

10. The method of claim 9 wherein the ink further comprises a modified cellulose resin.

11. The method of claim 10, wherein the modified cellulose resin is selected from the group consisting of cellulose nitrate, ethyl cellulose, cellulose acetate, cellulose acetate butyrate, cellulose acetate propionate, and hydroxypropyl cellulose.

12. The method of claim 9 wherein the ink further comprises a modifying resin.

13. The method of claim 12 wherein the modifying resin is selected from the group consisting of acrylic copolymers, polyesters and polyurethanes.

14. The method of claim 9 wherein the ink contains less than about two percent by weight water.

15. The method of claim 9 wherein the polymeric colorant has the formula:

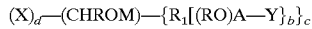

$$(X)_d\text{---}(CHROM)\text{---}\{R_1[(RO)A\text{---}Y]_b\}_c$$

wherein:

X is a polar group selected from sulfonic acids, sulfonic acid salts, sulfonamides, sulfonates, carboxylic acids, carboxylic acid salts, carboxylic acid amides, carboxylic aldehydes, ureas, thioureas, nitro groups, hydroxy groups, polyethers, and hydroxyalkylethers;

R is unsubstituted or substituted straight or branched alkylene of 2–4 carbons, or mixtures thereof;

Y is selected from H, alkanoyl, aroyl, alkoxycarbonyl, unsubstituted or substituted carbamoyl, or —CH$_2$CH(R$_2$)—X;

R$_1$ is selected from nitrogen, oxygen, sulfur, or a sulfur-containing divalent linking group;

R$_2$ is hydrogen or a lower alkyl group containing one to about five carbon atoms;

a is an integer of from 6 to about 40;

b and c are each independently selected from one or two;

d is an integer of from one to four; the product of (a) (b) (c) is an integer of from 6 to about 40;

and CHROM is a chromophore selected from nitro, nitroso, monoazo, disazo and trisazo, diarylmethane, triarylmethane, xanthane, acridine, methine, thiazole, indamine, azine, oxazine, or anthraquinone, where the {RO}$_a$ moiety is bonded to a carbocyclic aromatic ring of the (CHROM) through R$_1$.

* * * * *